United States Patent [19]

Hashimoto

[11] Patent Number: 4,871,129
[45] Date of Patent: Oct. 3, 1989

[54] SPEED CHANGE OF FISHING REEL

[75] Inventor: Hiroshi Hashimoto, Tokyo, Japan

[73] Assignee: Daiwa Seiko Inc., Tokyo, Japan

[21] Appl. No.: 319,194

[22] Filed: Mar. 6, 1989

[30] Foreign Application Priority Data

Mar. 25, 1988 [JP] Japan .................................. 62-71051

[51] Int. Cl.<sup>4</sup> ............................................. A01K 89/01
[52] U.S. Cl. ..................................... 242/255; 74/763; 242/271
[58] Field of Search ............... 242/215, 211, 212, 216; 74/781 R, 763

[56] References Cited

U.S. PATENT DOCUMENTS

| 626,445 | 6/1899 | Smith | 74/781 R |
|---|---|---|---|
| 717,409 | 12/1902 | Jeffs | 74/781 R |
| 2,335,752 | 11/1943 | Geiger | 242/215 |
| 2,487,387 | 11/1949 | Sears | 242/215 X |
| 3,116,892 | 1/1964 | Pickard | 242/215 |
| 4,546,937 | 10/1985 | Hideo | 242/219 |

FOREIGN PATENT DOCUMENTS

| 385238 | 9/1960 | Japan . | |
|---|---|---|---|
| 60-182779 | 12/1985 | Japan . | |
| 61-207168 | 12/1986 | Japan . | |
| 437044 | 10/1935 | United Kingdom | 242/215 |
| 1199405 | 7/1970 | United Kingdom | 242/215 |

Primary Examiner—Stuart S. Levy
Assistant Examiner—Katherine Matecki
Attorney, Agent, or Firm—Browdy and Neimark

[57] ABSTRACT

A speed change gear of a fishing reel is disclosed. The speed change gear comprises a pinion for rotating a spool fitted to a spool shaft; a driving gear mounted rotatably to a handle shaft and engaged with the pinion; an internal gear formed on the inner peripheral surface of the driving gear; a planetary gear supported rotatably by a support and engaging with the internal gear; anchor portions disposed at the inner and outer end portions of the clutch gear, and engaging with anchor portions formed on the support and on the side plate, respectively; and an operation lever for switching the anchor portions at the inner and outer end portions of said clutch gear, disposed on the side plate.

2 Claims, 3 Drawing Sheets

4,871,129

SPEED CHANGE OF FISHING REEL

BACKGROUND OF THE INVENTION

1. Field of the Invention

This invention relates to an improvement in a speed change gear of a fishing reel.

2. Description of the Prior Art

Fishing reels for changing a line take-up speed to high or low speed by switching high and low speed driving gears of a handle shaft and a pinion of a sppol shaft engaging with these driving gears in accordance with a take-up load of a fishing line include an automatic speed change system disclosed in Japanese Patent Publication No. 5238/1963 and Japanese Utility Model Laid-Open No. 207168/1986 and a manual speed change system disclosed in Japanese Utility Model Laid-Open No. 182779/1985.

Although the conventional automatic speed change system described above may seem convenient, it involves the drawback that the line take-up speed cannot be changed freely to a high or low speed according to various fishing conditions or as desired by an angler irrespective of the take-up load because the automatic speed change is attained by the relationship between a drag set force and the tension of the fishing line. Furthermore, this system is not free from a drawback that since a high speed gear and a low speed gear receive frictional resistance and rotate idly when the speed is changed from high speed to low speed or vice versa, take-up efficiency drops that much.

The manual speed change system can change the speed to high or low speed as desired by the angler and can take up the fishing line. In accordance with the conventional system, however, a high speed driving gear or a low speed driving gear on a handle shaft is slide by a cam and engaged with a high speed pinion or with a low speed pinion on the spool shaft to change the speed. Therefore, whenever the switching is made, a gear that has been separated comes to engage with the pinion. This results in the problems that switching and engaging operation cannot be made smoothly under a load state, a gear surface is likely to be damaged or worn out and the mechanism grows in size.

SUMMARY OF THE INVENTION

It is therefore an object of the present invention to provide a speed change gear of a fishing reel which removes the drawbacks of the conventional manual switching system and has high take-up efficiency while making the most of the conventional manual speed change gear so that the fishing line can be taken up freely at a high speed or a low speed at the will of the angler.

The first characteristic of the present invention lies in that while a driving gear disposed on a handle shaft and a pinion disposed on a spool shaft are always kept engaged with each other by utilizing a planetary gear mechanism, a spool can be switched manually to a high or low speed so that switching operation can be effected smoothly even under a load state where a tension acts on a fishing line, and the wear and damage of the gear surface of the driving gear and pinion as well as drop in rotation performance, that have been the defects of the conventional manual switching system, can be prevented.

The second characteristic of the present invention lies in that both the driving gear and the pinion neither receive frictional resistance nor rotate idly at the time of high or low speed take-up and the take-up operation can be made lightly without lowering take-up efficiency.

The above and other objects and novel features of the present invention will become more apparent from the following description when taken in conjunction with the accompanying drawings.

DESCRIPTION OF THE PREFERRED EMBODIMENT

Figure 1:
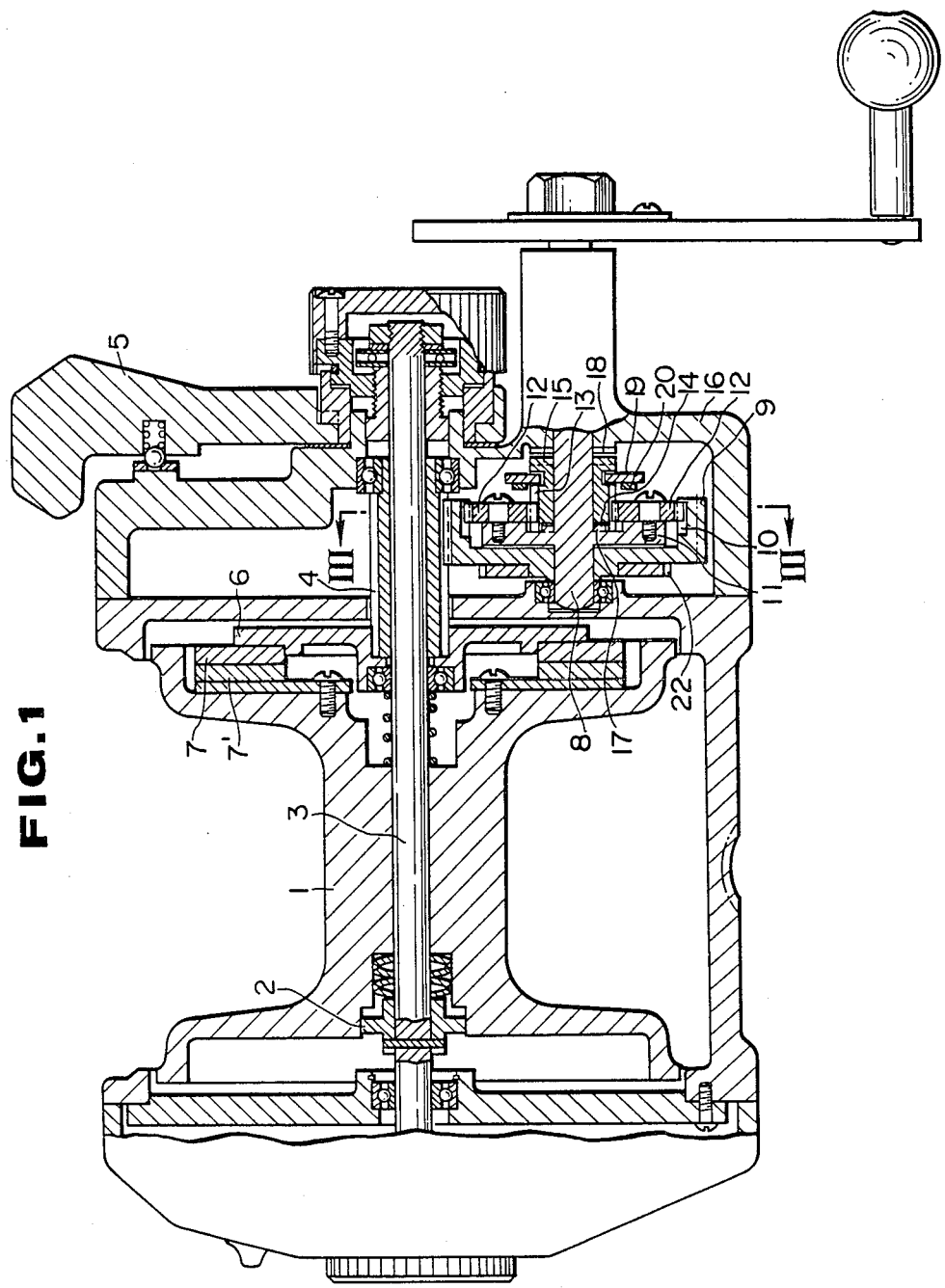
FIG. 1 is a longitudinal sectional front view of the invention at the time of low speed take-up.
Figure 2:
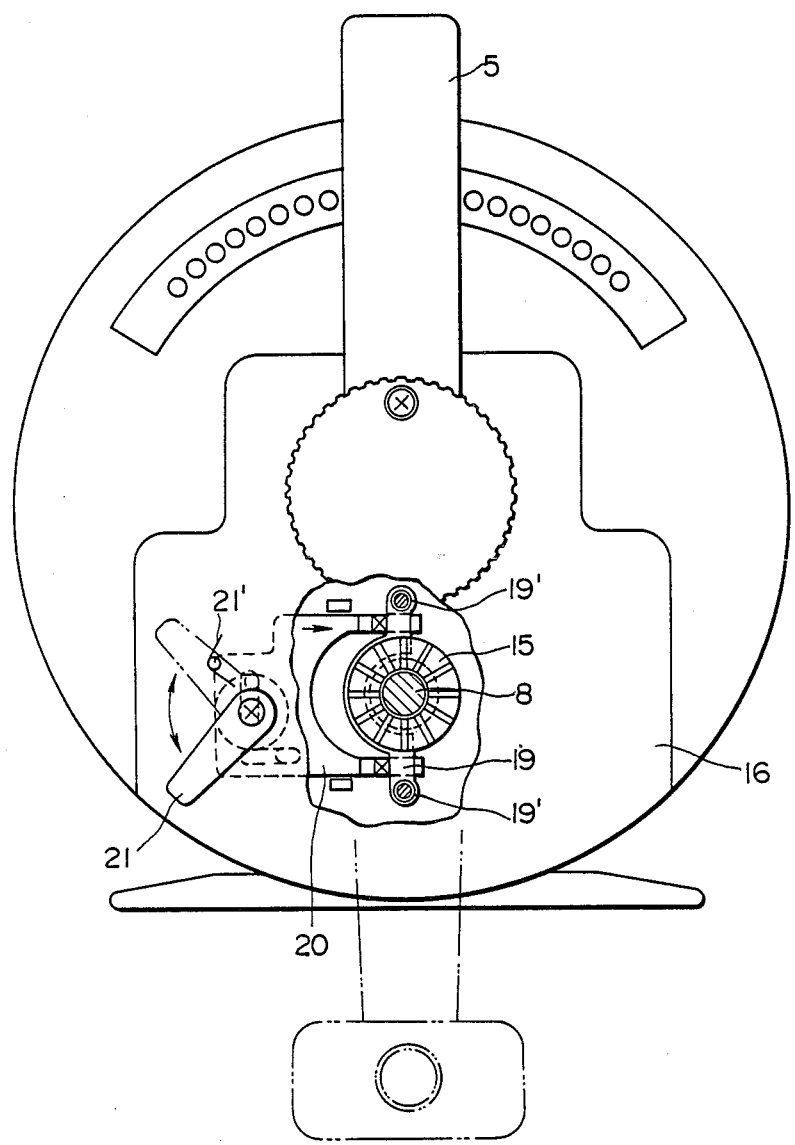
FIG. 2 is a partial cut-away side view.
Figure 3:
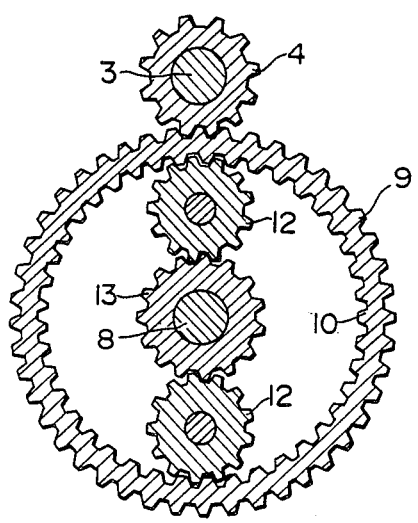
FIG. 3 is a sectional view taken along line III—III in FIG. 1.
Figure 4:
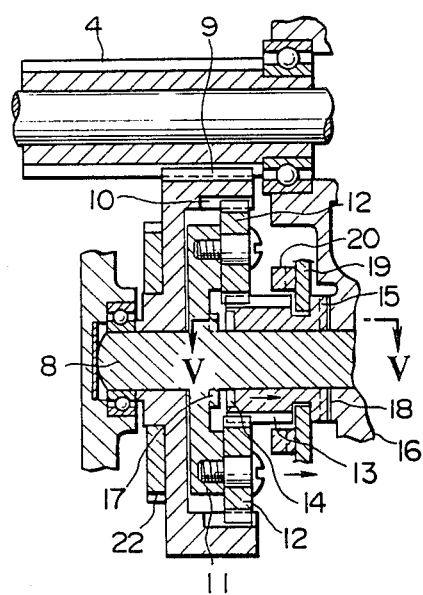
FIG. 4 is a longitudinal sectional front view of the principal portions of the invention at the time of high speed take-up.
Figure 5:
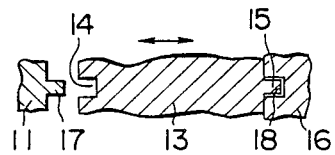
FIG. 5 is a sectional view taken along line V—V of FIG. 4.

Hereinafter, an embodiment of the present invention will be described with reference to the accompanying drawings.

A spool 1 is engaged, movably only in an axial direction, integrally with one of the ends of a spool shaft 3 by an engagement member 2. A pinion 4 is fitted rotatably to the other end of the spool shaft 3. A drag adjustment lever 5 disposed at the outer end portion of the spool shaft 3 slides the spool shaft 3 in the axial direction as is known in the art so that a transmission plate 6 disposed at the end portion of the pinion 4 can come into pressure contact with the side surface of the spool 1 through brake plates 7, 7' and the rotation of the pinion 4 can be transmitted to the spool 1 through the transmission plate 6 and the brake plates 7, 7'.

A driving gear 9 which is rotatably fitted to a handle shaft 8 engages with the pinion 4 and an internal gear 10 is formed on the inner peripheral surface of the driving gear 9.

One or a plurality of planetary gears 12 are disposed on the same circumference and supported pivotally by a support member 11 which is disposed integrally with the handle shaft 8 outside the driving gear 9. The planetary gears 12 engage with the internal gear 10 and a clutch gear 13 fitte slidably to the handle shaft 8 and recessed/projecting anchor portions 14, 15 are disposed at the inner and outer end of the clutch gear 13. Projecting/recessed anchor portions 17, 18 and disposed on the support member 11 and on the side plate 16 to mesh with the recessed/projecting anchor portions 14, 15, respectively.

A clutch plate 19 biased by a coil spring 19' engages with the clutch gear 13 on the side of the support member 11. When this clutch plate 19 is operated by an operation lever 21 disposed on the side plate 16 through an operation plate 20 and biased distributedly by a torsion spring 21', the clutch gear 13 is slid inwardly and outwardly on the handle shaft 8 so that its anchor portion 14 engages with the anchor portion 17 and its anchor portion 15 engages with the anchor portion 18.

Reference numeral 22 in the drawing represents a reversing prevention ratchet which engages with an anchor pawl, not shown, and prevents reversing of the driving gear 9 as is well known in the art.

When the handle shaft 8 is rotated while the clutch gear 13 is slid inwardly by the operation lever 21 and its anchor portion 14 is engaged with the anchor portion 17 of the support 11, the clutch gear 13, the planetary gear 12 and the internal gear 10 rotate integrally the driving gear 9 so that the pinion 4 engaging with the driving gear 9 is rotated and the spool 1 is rotated at a low speed.

When the handle 8 is rotated while the clutch gear 13 is slid outwardly by the operation lever 21 and its anchor portion 15 is engaged with the anchor portion 18 of the side plate 16, the rotation of the clutch gear 13 is checked so that the planetary gear 12 undergoes both rotation and revolution due to its engagement with the internal gear 10 and the clutch gear 13 to rotate the driving gear 9 at a high speed and thereby the spool 1 through the pinion 4 engaging with them.

The embodiment described above represents the case where the spool 1 is engaged with the spool shaft 3 and rotates integrally with it. However, the present invention can be applied to a double bearing type reel in which the spool 1 is supported rotatable through bearings on the spool shaft 3 or to a fixed spool shaft in a single bearing type reel.

In accordance with the present invention described above, the pinion disposed on the spool shaft and the driving gear of the handle shaft are kept always under the engagement state. The internal gear is formed on the inner peripheral surface of the driving gear and the planetary gear engaging with the internal gear is engaged with the clutch gear fitted to the handle shaft. Accordingly, the speed change of the spool shaft can be made quickly by engaging the clutch gear either with the support of the handle shaft or with the side plate by sliding the clutch gear by the operation lever. In this manner the present invention can reliably prevent wear and damage of the gear surface that would develop under such a load state where the pinion and the driving gear are spaced apart from each other and the tension acts on the line, as has occured in the prior art devices at the time of the speed change, and can smoothly make a switching operation without lowering rotation efficiency. Accordingly, the angler can freely switch a line take-up speed to a high or low speed as he desires or according to his fishing method. Moreover, the take-up operation can be made easily and smoothly because neither a high speed nor low speed gear rotates idly in the presence of frictional resistance.

What is claimed is:

1. A speed change gear of a fishing reel comprising:
   a reel frame comprising two side plates;
   a pinion for rotating a spool rotatably mounted on a spool shaft;
   a driving gear having an inner peripheral surface mounted rotatably to a handle shaft and engaged with said pinion;
   an internal gear formed on the inner peripheral surface of said driving gear;
   a planetary gear supported rotatably by a support formed integrally with said handle shaft and engaging with said internal gear;
   a clutch gear having inner and outer end portions fitted slidably to said handle shaft and engaging with said planetary gear;
   first and second anchor portions disposed at the inner and outer end portions of said clutch gear respectively, and third and fourth anchor portions formed on said support and on one of said side plates, respectively; and
   an operation lever disposed on one of said side plates for axially sliding the clutch gear on the handle shaft to selectively engage the first anchor portion with the third anchor portion, or the second anchor portion with the fourth anchor portion.

2. A speed change gear of a fishing reel according to claim 1, further comprising a transmission plate rotatable integrally with said pinion, and brake plates fixed to the side surface of said spool and opposed to said transmission plate, and means for frictionally engaging the transmission plate with the brake plates, so that the rotation of said pinion can be transmitted to said spool.

* * * * *